US010491483B2

United States Patent
Boutros et al.

(10) Patent No.: US 10,491,483 B2
(45) Date of Patent: Nov. 26, 2019

(54) USING APPLICATION PROGRAMMING INTERFACE CALLS FOR COMMUNICATION BETWEEN NETWORK FUNCTIONS

(71) Applicant: Nicira, Inc., Palo Alto, CA (US)

(72) Inventors: Sami Boutros, Union City, CA (US); Mani Kancherla, Cupertino, CA (US); Ankur Dubey, Santa Clara, CA (US)

(73) Assignee: NICIRA, INC., Palo Alto, CA (US)

( * ) Notice: Subject to any disclaimer, the term of this patent is extended or adjusted under 35 U.S.C. 154(b) by 34 days.

(21) Appl. No.: 15/788,643

(22) Filed: Oct. 19, 2017

(65) Prior Publication Data
US 2019/0123966 A1  Apr. 25, 2019

(51) Int. Cl.
H04L 12/24 (2006.01)
G06F 9/54 (2006.01)
H04L 12/26 (2006.01)

(52) U.S. Cl.
CPC .............. *H04L 41/12* (2013.01); *G06F 9/547* (2013.01); *H04L 41/0866* (2013.01); *H04L 41/5058* (2013.01); *H04L 43/0817* (2013.01); *H04L 41/5096* (2013.01)

(58) Field of Classification Search
CPC ...... H04L 41/12; H04L 41/0866; G06F 9/547
See application file for complete search history.

(56) References Cited

U.S. PATENT DOCUMENTS

| 9,438,556 | B1* | 9/2016 | Ganguly | H04L 61/2007 |
| 2006/0233154 | A1* | 10/2006 | Eckert | H04L 12/1863 370/351 |
| 2008/0219237 | A1* | 9/2008 | Thubert | H04L 45/16 370/349 |
| 2008/0240121 | A1* | 10/2008 | Xiong | H04L 12/4633 370/401 |
| 2014/0313928 | A1* | 10/2014 | Fernando | H04L 45/02 370/254 |
| 2015/0172170 | A1* | 6/2015 | Bosch | H04L 45/20 709/238 |
| 2015/0263899 | A1* | 9/2015 | Tubaltsev | H04L 45/02 370/254 |
| 2015/0271011 | A1* | 9/2015 | Neginhal | H04L 41/0803 370/254 |

(Continued)

Primary Examiner — Hashim S Bhatti
(74) Attorney, Agent, or Firm — Adeli LLP

(57) ABSTRACT

For a network including multiple host machines that each execute a number of network functions some embodiments provide a method for the network functions to advertise the availability of the network function and network addresses (e.g., internet protocol (IP) addresses) associated with the network functions to the other network functions using application programming interfaces (APIs). In some embodiments, non-routing network functions advertise their availability and/or network addresses associated with the network function to a routing network function (e.g., a routing network function that is part of a service router) for the routing network function to advertise to other network elements (e.g. other routing elements or other network functions that need to reach the advertising network function). These advertisements, in some embodiments, are part of participation in a dynamic routing protocol.

21 Claims, 7 Drawing Sheets

(56) References Cited

U.S. PATENT DOCUMENTS

| | | | |
|---|---|---|---|
| 2016/0112255 A1* | 4/2016 | Li | H04L 12/462 |
| | | | 709/220 |
| 2016/0248663 A1* | 8/2016 | Patel | H04L 45/12 |
| 2017/0005923 A1* | 1/2017 | Babakian | H04L 69/324 |
| 2017/0237656 A1* | 8/2017 | Gage | H04L 45/74 |
| | | | 370/392 |
| 2017/0310589 A1* | 10/2017 | Tambakuwala | H04L 45/023 |
| 2018/0176246 A1* | 6/2018 | Teague | H04L 63/1458 |

* cited by examiner

USING APPLICATION PROGRAMMING INTERFACE CALLS FOR COMMUNICATION BETWEEN NETWORK FUNCTIONS

BACKGROUND

In a software-defined network, a single host machine may execute a large number (e.g., hundreds or thousands) of network function elements. To implement routing protocols designed for advertising service and routing availability in physical systems, each network function element currently implements a protocol stack. Implementing a protocol stack for each network function element is resource-intensive.

An alternative way of advertising network availability of services and network addresses for routing that does not require a protocol stack for each network function would improve resource use in virtualized environments.

BRIEF SUMMARY

For a network including multiple host machines that each execute a number of network functions, some embodiments provide a method for the network functions to advertise the availability of the network function and network addresses (e.g., internet protocol (IP) addresses) associated with the network functions to the other network functions using application programming interfaces (APIs). In some embodiments, non-routing network functions advertise their availability and/or network addresses associated with the network function to a routing network function (e.g., a routing network function that is part of a service router) for the routing network function to advertise to other network elements (e.g. other routing elements or other network functions that need to reach the advertising network function). These advertisements, in some embodiments, are part of participation in a dynamic routing protocol.

Some network functions (or services) that need to advertise their availability include a load balancing function, a network address translation (NAT) function, a routing function, a firewall function, and a virtual private network (VPN) function. The network functions, in some embodiments, are associated with backend servers or compute nodes (e.g., a load balancer for a set of backend servers associated with a virtual IP (VIP) address or NAT for a set of compute nodes). In order to provide up-to-date information, the network function monitors the health of the network function (e.g., the backend servers) in order to advertise unavailability of the network function when the network function fails.

Routing network functions, in some embodiments, communicate through APIs with other routing network functions executing on the same host machine for those other routing network functions to advertise the availability of the network functions and network addresses to routers not executing on the host machine. Communications with routers not executing on the same host machine, in some embodiments, are also made using APIs when available or may use other routing protocols. In some embodiments, a routing network function that receives a number of network addresses (e.g., 10.1.2.0/24, 10.1.3.0/24, etc.) will advertise a less specific network address (e.g., 10.1.0.0/16). If the router (or routing network function) that receives the less specific network address subsequently receives a more-specific address (e.g., 10.1.1.0/24) from another source it can selectively install the network address on the original routing network function using an API.

The method can also be used in networks employing network functions implemented in an active-standby configuration in which network traffic is directed to one (or a group of) active network function(s) with standby network functions available to provide the network function if the active network function becomes unavailable. In some embodiments, a standby network function advertises its availability with a higher cost than an active network function on another host machine. A standby network function, in some embodiments, uses APIs to communicate to other network functions on a same host machine that it is a standby network function so that the other network functions use the network function on another host machine to process network traffic.

The preceding Summary is intended to serve as a brief introduction to some embodiments of the invention. It is not meant to be an introduction or overview of all inventive subject matter disclosed in this document. The Detailed Description that follows, and the Drawings that are referred to in the Detailed Description, will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Figure 1:
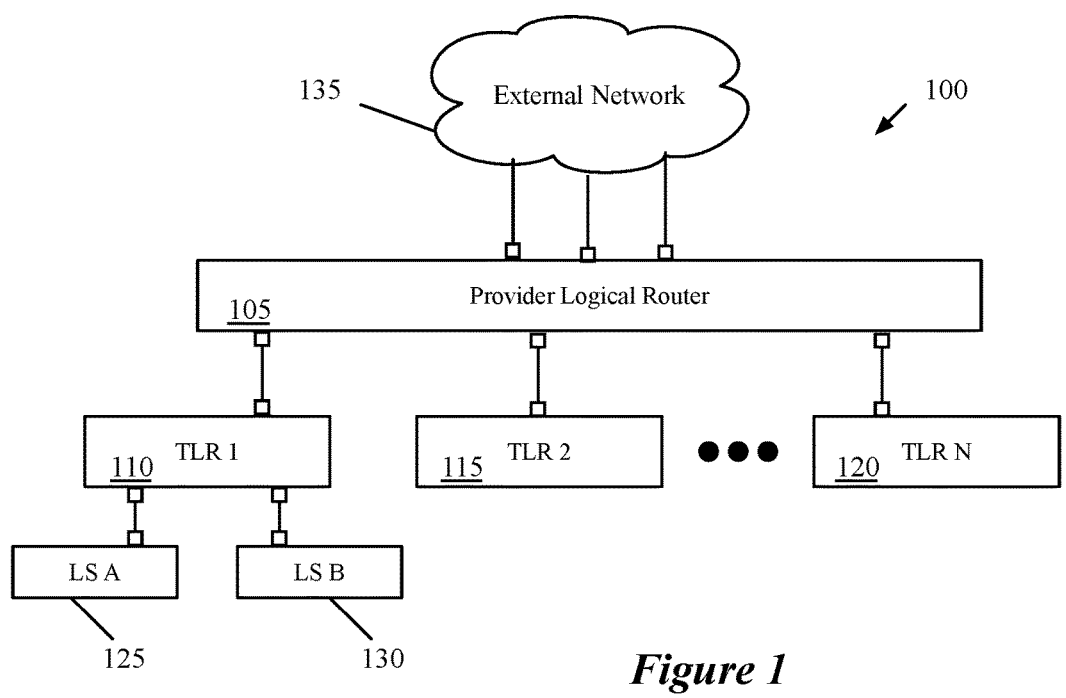
FIG. 1 conceptually illustrates a configuration view of a logical network.
Figure 2:
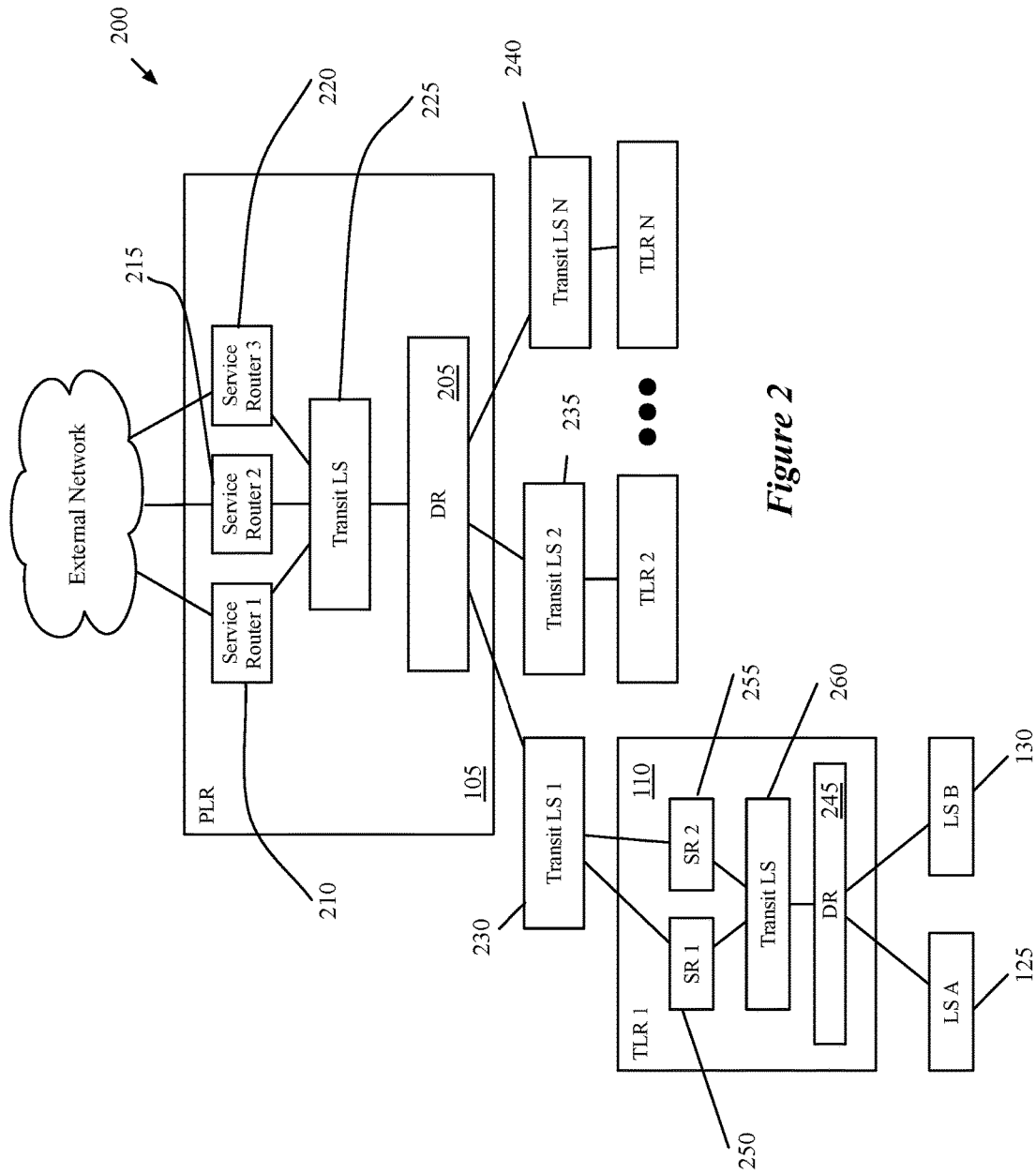
FIG. 2 conceptually illustrates a management view of a logical network implementing the configuration view illustrated in FIG. 1.
Figure 3:
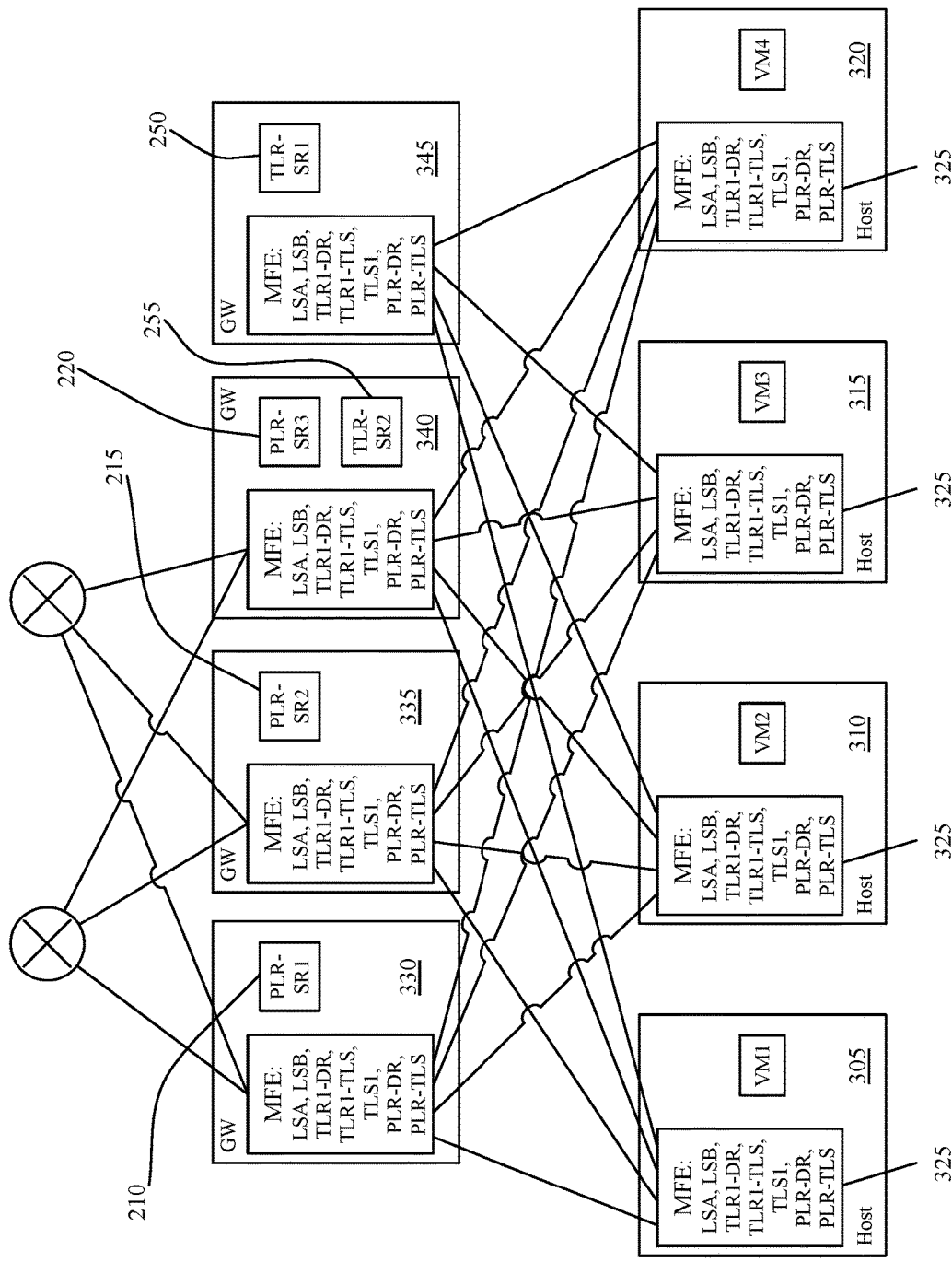
FIG. 3 conceptually illustrates a physical implementation of the logical network of FIG. 1.

For a network including multiple host machines that each execute a number of network functions, some embodiments provide a method for the network functions to advertise the availability of the network function and network addresses (e.g., internet protocol (IP) addresses) associated with the network functions to the other network functions using application programming interfaces (APIs). In some embodiments, non-routing network functions advertise their availability and/or network addresses associated with the network function to a routing network function (e.g., a routing network function implemented as part of a service router pipeline) for the routing network function to advertise to other network elements (e.g. other routing elements or other network functions that need to reach the advertising network function). These advertisements, in some embodiments, are part of participation in a dynamic routing protocol (e.g., border gateway protocol (BGP), open shortest past first (OSPF), etc.). FIGS. 1, 2, and 3 illustrate configuration, management, and physical views of an exemplary network of some embodiments in which the method is implemented.

A user-defined logical network, as used in this application, refers to a particular logical abstraction of a network. In some embodiments, the logical abstraction includes logical counterparts to network elements of a physical network such as, for example, switches, hubs, routers, bridges, ports, load balancers, firewalls, etc. The logical forwarding elements (e.g., a logical switch or logical router) in some embodiments are implemented by a set of managed forwarding elements (e.g., physical or virtual/software switches, or routers) executing on a set of host machines. A particular host machine may host data compute nodes connected to multiple different logical networks and at least one managed forwarding element that implements all the logical networks to which the data compute nodes logically connect.

FIG. 1 conceptually illustrates a logical network 100 with two tiers of logical routers. As shown, the logical network 100 includes, at the layer 3 level, a provider logical router (PLR) 105 and several tenant logical routers (TLRs) 110-120. The first tenant logical router 110 has two logical switches 125 and 130 attached, with one or more data compute nodes coupling to each of the logical switches. For simplicity, only the logical switches attached to the first TLR 110 are shown, although the other TLRs 115-120 would typically have logical switches attached (to which data compute nodes couple). A given logical router, in some embodiments, also includes network functions such as, a load balancing function, a network address translation (NAT) function, a routing function, a firewall function, and a virtual private network (VPN) function not depicted in FIGS. 1 and 2.

In some embodiments, any number of TLRs may be attached to a PLR such as the PLR 105. Some datacenters may have only a single PLR to which all TLRs implemented in the datacenter attach, whereas other datacenters may have numerous PLRs. For instance, a large datacenter may want to use different PLR policies for different tenants, or may have too many different tenants to attach all of the TLRs to a single PLR. Part of the routing table for a PLR includes routes for all of the logical switch domains of its TLRs, so attaching numerous TLRs to a PLR creates several routes for each TLR just based on the subnets attached to the TLR. The PLR 105, as shown in the figure, provides a connection to the external physical network 135; some embodiments only allow the PLR to provide such a connection, so that the datacenter provider can manage this connection. Each of the separate TLRs 110-120, though part of the logical network 100, are configured independently (although a single tenant could have multiple TLRs if they so chose). Further details about the logical network can be found in U.S. Patent Publication 2016/0226754, filed Jul. 30, 2015, which is incorporated herein by reference FIG. 2 illustrates the management plane view 200 for the logical topology 100 when the TLR 110 has a centralized component (e.g., because stateful services that cannot be distributed are defined for the TLR). In some embodiments, stateful services such as firewalls, NAT, load balancing, etc., are only provided in a centralized manner. Other embodiments allow for some, or all, of such services to be distributed. Only details of the first TLR 110 are shown for simplicity; the other TLRs may have the same defined components (DR, transit LS, and two SRs) or have only a DR.

The PLR 105 includes a DR 205 and three SRs 210-220, connected together by a transit logical switch 225. In addition to the transit logical switch 225 within the PLR 105 implementation, the management plane also defines separate transit logical switches 230-240 between each of the TLRs and the DR 205 of the PLR. In the case in which the TLR 110 is completely distributed (not shown), the transit logical switch 230 connects to a DR 245 that implements the configuration of the TLR 110. Packet processing in this environment is described in greater detail in U.S. Patent Publication 2016/0226754.

The partially centralized implementation of the TLR 110 includes a DR 245 to which the logical switches 125 and 130 attach, as well as two SRs 250 and 255. For simplicity, only SRs 250 and 255 are shown, but they represent a service router pipeline including a routing network function and a set of additional network functions such as a load balancing function, a network address translation (NAT) function, a firewall function, and a virtual private network (VPN) function. As in the PLR implementation, the DR and the two SRs each have interfaces to transit logical switch 260. This transit logical switch serves the same purposes as the switch 225, in some embodiments. For TLRs, some embodiments implement the SRs in active-standby manner, with one of the SRs designated as active and the other designated as standby. The individual network functions that make up the SR pipeline may have active instances executing on different physical machines as will be discussed further in reference to FIG. 3. Thus, so long as the active SR component is operational, packets sent by a data compute node attached to one of the logical switches 125 and 130 will be sent to the active SR rather than the standby SR.

The above figure illustrates the management plane view of logical routers of some embodiments. In some embodiments, an administrator or other user provides the logical topology (as well as other configuration information) through an API. This data is provided to a management plane, which defines the implementation of the logical network topology (e.g., by defining the DRs, SRs, transit logical switches, etc.). In addition, in some embodiments a user associates each logical router (e.g., each PLR or TLR) with a set of physical machines (e.g., a pre-defined group of machines in the datacenter) for deployment. For purely distributed routers, such as TLR 105, as implemented in FIG. 2, the set of physical machines is not important, as the DR is implemented across the managed forwarding elements that reside on hosts along with the data compute nodes that connect to the logical network. However, if the logical router implementation includes SRs, then these SRs will each be deployed on specific physical machines. In some embodiments, the group of physical machines is a set of machines designated for the purpose of hosting SRs (as opposed to user VMs or other data compute nodes that attach to logical switches). In other embodiments, the SRs are deployed on machines alongside the user data compute nodes.

In some embodiments, the user definition of a logical router includes a particular number of uplinks. Described herein, an uplink is a northbound interface of a logical router in the logical topology. For a TLR, its uplinks connect to a PLR (all of the uplinks connect to the same PLR, generally). For a PLR, its uplinks connect to external routers. Some embodiments require all of the uplinks of a PLR to have the same external router connectivity, while other embodiments allow the uplinks to connect to different sets of external routers. Once the user selects a group of machines for the logical router, if SRs are required for the logical router, the management plane assigns each of the uplinks of the logical router to a physical machine in the selected group of machines. The management plane then creates an SR on each of the machines to which an uplink is assigned. Some embodiments allow multiple uplinks to be assigned to the same machine, in which case the SR on the machine has multiple northbound interfaces.

As mentioned above, in some embodiments, the SR may be implemented as a virtual machine or other container, or as a VRF context (e.g., in the case of DPDK-based SR implementations). In some embodiments, the choice for the implementation of an SR may be based on the services (e.g., network functions) chosen for the logical router and which type of SR best provides those services.

In addition, the management plane of some embodiments creates the transit logical switches. For each transit logical switch, the management plane assigns a unique VNI to the logical switch, creates a port on each SR and DR that connects to the transit logical switch, and allocates an IP address for any SRs and the DR that connect to the logical switch. Some embodiments require that the subnet assigned to each transit logical switch is unique within a logical L3 network topology having numerous TLRs (e.g., the network topology 100), each of which may have its own transit logical switch. That is, in FIG. 2, transit logical switch 225 within the PLR implementation, transit logical switches 230-240 between the PLR and the TLRs, and transit logical switch 260 (as well as the transit logical switch within the implementation of any of the other TLRs) each require a unique subnet. Furthermore, in some embodiments, the SR may need to initiate a connection to a VM in logical space, e.g. HA proxy. To ensure that return traffic works, some embodiments avoid using link local IP addresses.

Some embodiments place various restrictions on the connection of logical routers in a multi-tier configuration. For instance, while some embodiments allow any number of tiers of logical routers (e.g., a PLR tier that connects to the external network, along with numerous tiers of TLRs), other embodiments only allow a two-tier topology (one tier of TLRs that connect to the PLR). In addition, some embodiments allow each TLR to connect to only one PLR, and each logical switch created by a user (i.e., not a transit logical switch) is only allowed to connect to one PLR or one TLR. Some embodiments also add the restriction that southbound ports of a logical router must each be in different subnets. Thus, two logical switches may not have the same subnet if connecting to the same logical router. Lastly, some embodiments require that different uplinks of a PLR must be present on different gateway machines. It should be understood that some embodiments include none of these requirements, or may include various different combinations of the requirements.

FIG. 3 conceptually illustrates a physical implementation of the management plane constructs for a two-tiered logical network shown in FIG. 2, in which the TLR 110 and the PLR 105 both include SRs as well as a DR. It should be understood that this figure only shows the implementation of the TLR 110, and not the numerous other TLRs, which might be implemented on numerous other host machines, and the SRs of which might be implemented on other gateway machines.

This figure assumes that there are two VMs attached to each of the two logical switches 125 and 130, which reside on the four physical host machines 305-320. Each of these host machines includes a MFE 325. These MFEs may be flow-based forwarding elements (e.g., Open vSwitch) or code-based forwarding elements (e.g., ESX), or a combination of the two, in various different embodiments. These different types of forwarding elements implement the various logical forwarding elements differently, but in each case they execute a pipeline for each logical forwarding element that may be required to process a packet.

Thus, as shown in FIG. 3, the MFEs 325 on the physical host machines include configuration to implement both logical switches 125 and 130 (LSA and LSB), the DR 245 and transit logical switch 260 for the TLR 110, and the DR 205 and transit logical switch 225 for the PLR 105. Some embodiments, however, only implement the distributed components of the PLR on the host machine MFEs 325 (those that couple to the data compute nodes) when the TLR for a data compute node residing on the host machine does not have a centralized component (i.e., SRs). As discussed below, northbound packets sent from the VMs to the external network will be processed by their local (first-hop) MFE, until a transit logical switch pipeline specifies to send the packet to a SR. If that first SR is part of the TLR, then the first-hop MFE will not perform any PLR processing, and therefore the PLR pipeline configuration need not be pushed to these MFEs by the centralized controller(s). However, because of the possibility that one of the TLRs 115-120 may not have a centralized component, some embodiments always push the distributed aspects of the PLR (the DR and the transit LS) to all of the MFEs. Other embodiments only push the configuration for the PLR pipelines to the MFEs that are also receiving configuration for the fully distributed TLRs (those without any SRs).

In addition, the physical implementation shown in FIG. 3 includes four physical gateway machines 330-345 (also called edge nodes, in some embodiments) to which the SRs of the PLR 105 and the TLR 110 are assigned. In this case, the administrators that configured the PLR 105 and the TLR 110 selected the same group of physical gateway machines for the SRs, and the management plane assigned one of the SRs for both of these logical routers to the third gateway machine 340. As shown, the three SRs 210-220 for the PLR 105 are each assigned to different gateway machines 330-340, while the two SRs 250 and 255 for the TLR 110 are also each assigned to different gateway machines 340 and 345.

This figure shows the SRs as separate from the MFEs 325 that operate on the gateway machines. As indicated above, different embodiments may implement the SRs differently. Some embodiments implement the SRs as VMs (e.g., when the MFE is a virtual switch integrated into the virtualization software of the gateway machine, in which case the SR processing is performed outside of the MFE. On the other hand, some embodiments implement the SRs as VRFs within the MFE datapath (when the MFE uses DPDK for the datapath processing). In either case, the MFE treats the SR as part of the datapath, but in the case of the SR being a VM (or other data compute node), sends the packet to the separate SR for processing by the SR pipeline (which may include the performance of various services). As with the MFEs 325 on the host machines, the MFEs 325 of some embodiments are configured to perform all of the distributed processing components of the logical network.

As described in relation to FIG. 3, gateway machines implement a service router pipeline including a routing network function and additional network functions. The network functions need to communicate their availability to the routing network function and other network functions executing on the host machine. Some network functions (or services) that need to advertise their availability include a load balancing function, a network address translation (NAT) function, a routing function, a firewall function, and a virtual private network (VPN) function. The network functions, in some embodiments, are associated with backend servers or compute nodes (e.g., a load balancer for a set of backend servers associated with a virtual IP (VIP) address or NAT for a set of compute nodes). In order to provide up-to-date information, the network function monitors the health of the backend servers in order to advertise unavailability of the network function when the backend servers are unreachable.

Figure 4:
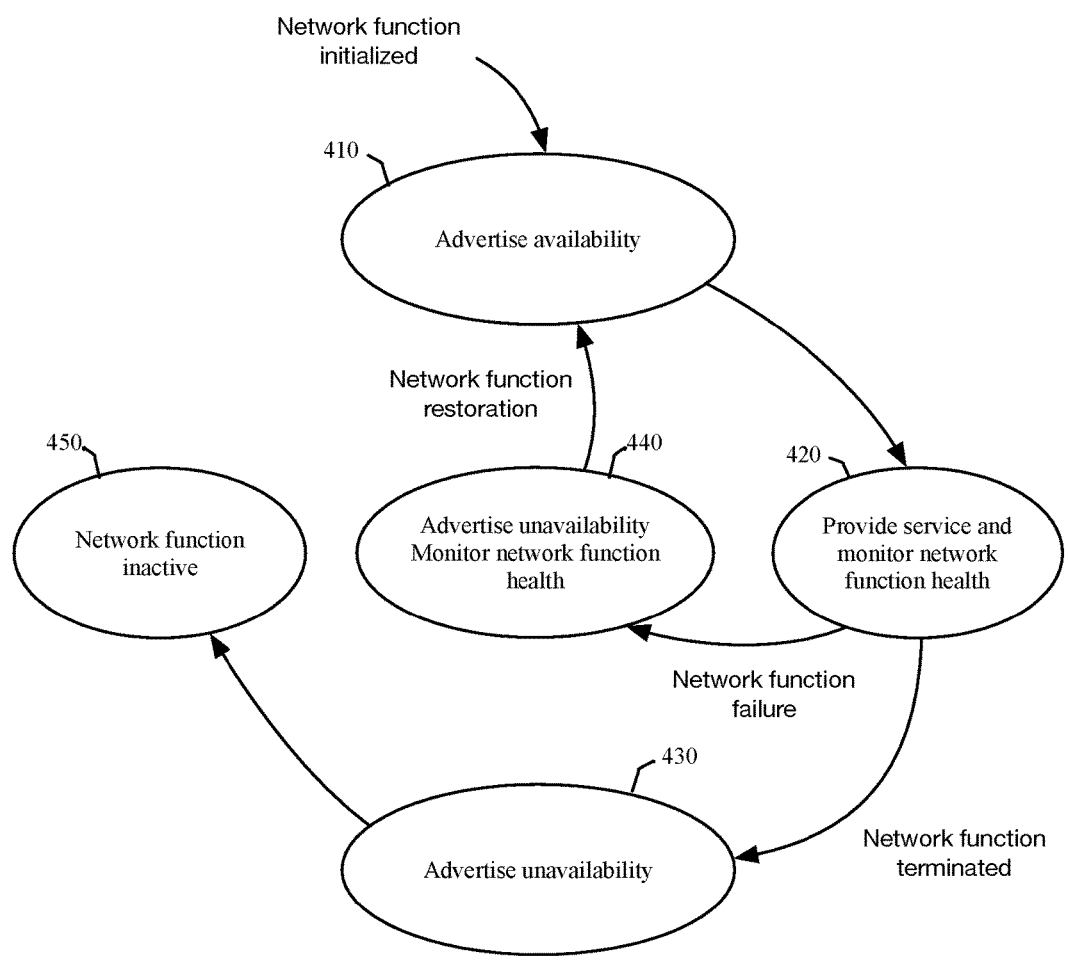
FIG. 4 conceptually illustrates a state diagram that describes different states for a network function of some embodiments.

FIG. 4 conceptually illustrates a state diagram 400 that describes different states for a network function of some embodiments that provides a service. In some embodiments, the network function executes on a particular host machine. It should be understood that the network function of some embodiments will have many different states relating to all different types of events and data, and that this state diagram 400 is specifically focused on events relating to the availability and unavailability of the network function.

As shown in FIG. 4, at initialization of a network function (e.g., based on a user configuring a logical router to provide a network service) the network function advertises (at 410) the availability of a network function to a set of other network functions using an application programming interface (API) provided by each network function in the set of other network functions (e.g., using an API call). Advertising the availability of the network function in some embodiments includes advertising the availability of the service, the availability of a virtual internet protocol (IP) address, and/or whether the network function is an active or a standby network function.

In embodiments employing an active-standby configuration, a network function that is operating as a standby network function may advertise its availability with a higher cost than an active network function (e.g., when the network function is addressed by an anycast address), and may additionally, or alternatively, advertise its status as a standby network function.

The network then transitions to state 420, in which the network function provides the service and monitors the network function to determine whether it is still functional. In some embodiments, monitoring the network function includes monitoring any backend servers or compute nodes associated with the network function (e.g., servers for which a load balancing function provides load balancing, or compute nodes for which a network address translation (NAT) function provides NAT). While in state 420 the network function in some embodiments receives an advertisement of the availability of another network function or network address from another network function (e.g., a routing network function). The received advertisement, in some embodiments, is based on an API call made by another networking function. Advertisements, in some embodiments, are additionally, or alternatively, received from a routing network function (whether executing on the same host machine or external to the host machine) using a standard routing protocol advertisement.

If, in state 420, the network function determines that the network function is not still available, the network function transitions to state 440 and advertises the unavailability of the network function using an API call. The network function in state 440 then monitors the health of the network function, and when the network function becomes available again the state transitions to state 410 as described above.

Alternatively, from state 420, the network function may be terminated (e.g., a user could configure the logical router to no longer provide the network service) and the network function transitions to state 430 to advertise the unavailability of the network function and then transitions to an inactive state 450.

Figure 5:
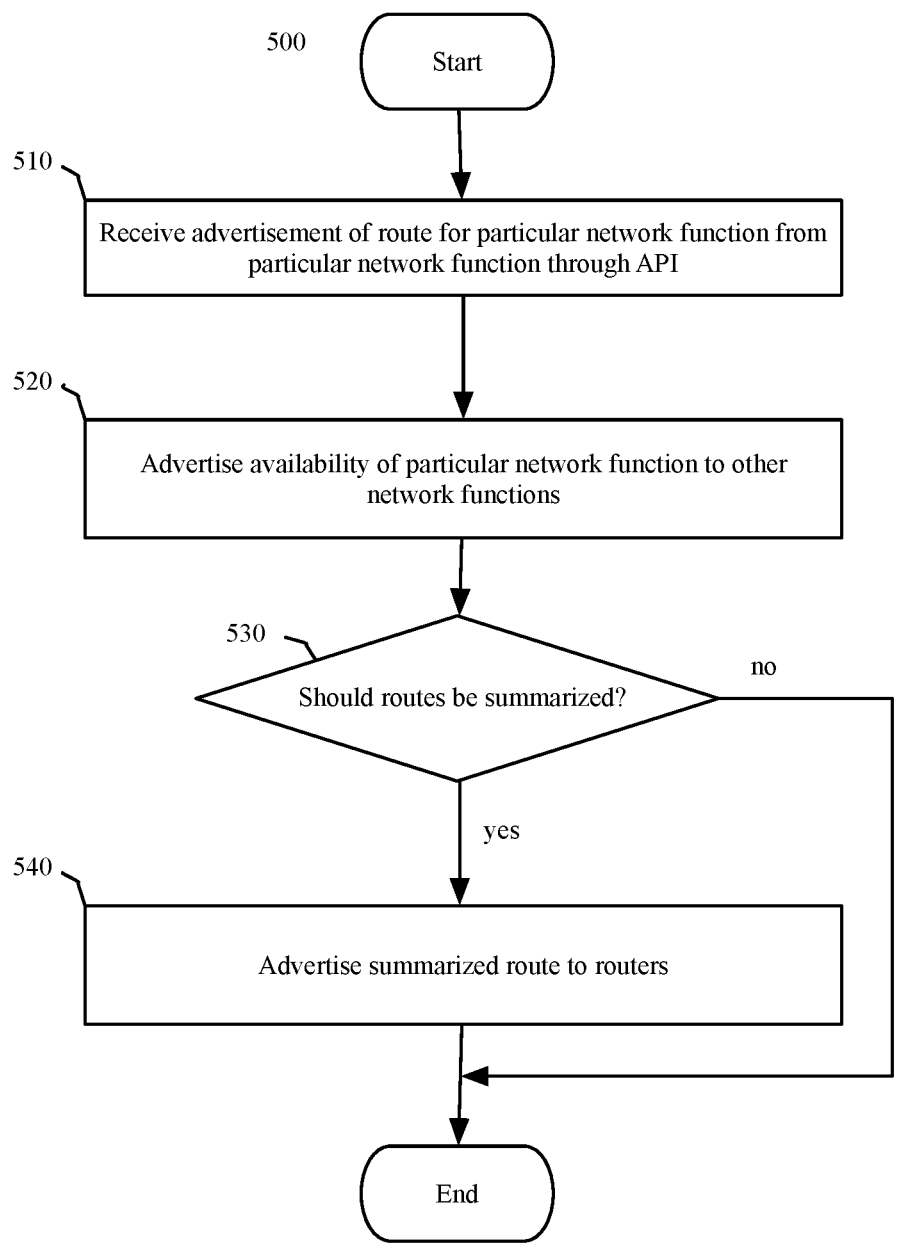
FIG. 5 conceptually illustrates a process for receiving a network function availability advertisement and advertising the availability to other network functions.

Routing network functions, in some embodiments, perform operations in addition to those of other network functions. FIG. 5 conceptually illustrates a process 500 for receiving a network function availability advertisement and advertising the availability to other network functions. In some embodiments, process 500 is performed by a routing network function. A routing network function, in some embodiments, is part of a tenant logical router or a provider logical router (e.g., a part of a service router pipeline).

Process 500 begins by receiving (at 510) an advertisement of a route for a networking function through an API call (e.g., through a call to an API provided by the routing network function). As discussed above for process 400, the advertisement can include an identification of the network function available, a network (e.g., IP) address for the network function, and/or an indication that the network function is a standby.

The process continues by advertising (at 520) the availability of the network function to other network functions. In some embodiments, the availability of the network function is advertised to other network functions on the same host machine using APIs while advertisements using standard routing protocols and protocol stacks are made to network elements provided on other host machines or by external devices (e.g., a physical router). In some embodiments, external network elements also provide APIs and can communicate using those APIs without relying on protocol stacks and traditional routing protocols.

In some embodiments, advertising (at 520) the availability of the network function to other routing elements that are on a datapath to an external network or networks includes a network (e.g., IP) address associated with the network function. If multiple network (e.g., IP) addresses have been received from multiple network functions, the process determines (at 530) whether the network addresses (e.g., IP addresses 10.1.2.0/24, 10.1.3.0/24, etc.) should be summarized using a shorter (less-specific) prefix (e.g., 10.1.0.0/16). If the process determines (at 530) that a set of network addresses should not be summarized, the process ends.

If the process determines that a summarized address can be advertised, it advertises (at 540) the summarized network address (e.g., 10.1.0.0/16). By advertising the less-specific summarized network address the routing network function reduces the number of routing entries necessary in the routing elements that receive the advertisement to direct the traffic to the routing network function. In some embodiments, the determination is made based on receiving a threshold number of network addresses (e.g., 10, 100, 1000) that can be summarized. Additional conditions for summarization, in some embodiments, include the degree of prefix reduction (e.g., no more than one byte will be summarized (a /24 prefix will be reduced to a /16 prefix but not to a /14 prefix)). The process then ends.

In some embodiments, a more-specific network address is received from the routing network function. The more-specific address (e.g., 10.1.5.0/24) is an address that is included in the less-specific summarized address (e.g., 10.1.0.0/16), but is not available at the routing network function that advertised the summarized address (e.g., was not among the network addresses received from the network functions executing on the same host machine). The more-specific address is received from a routing element that has received the more-specific address from a source other than the routing network function that advertised the summarized network address. The more-specific address, in some embodiments, is received through an API from the routing element whether it is executing on the same host machine or is external to the host machine. In some embodiments, a set of external routing elements communicates with the routing network function executing on the host machine using a standard routing protocol, while another set communicates using APIs common to both the external and internal routing elements.

Figure 6:
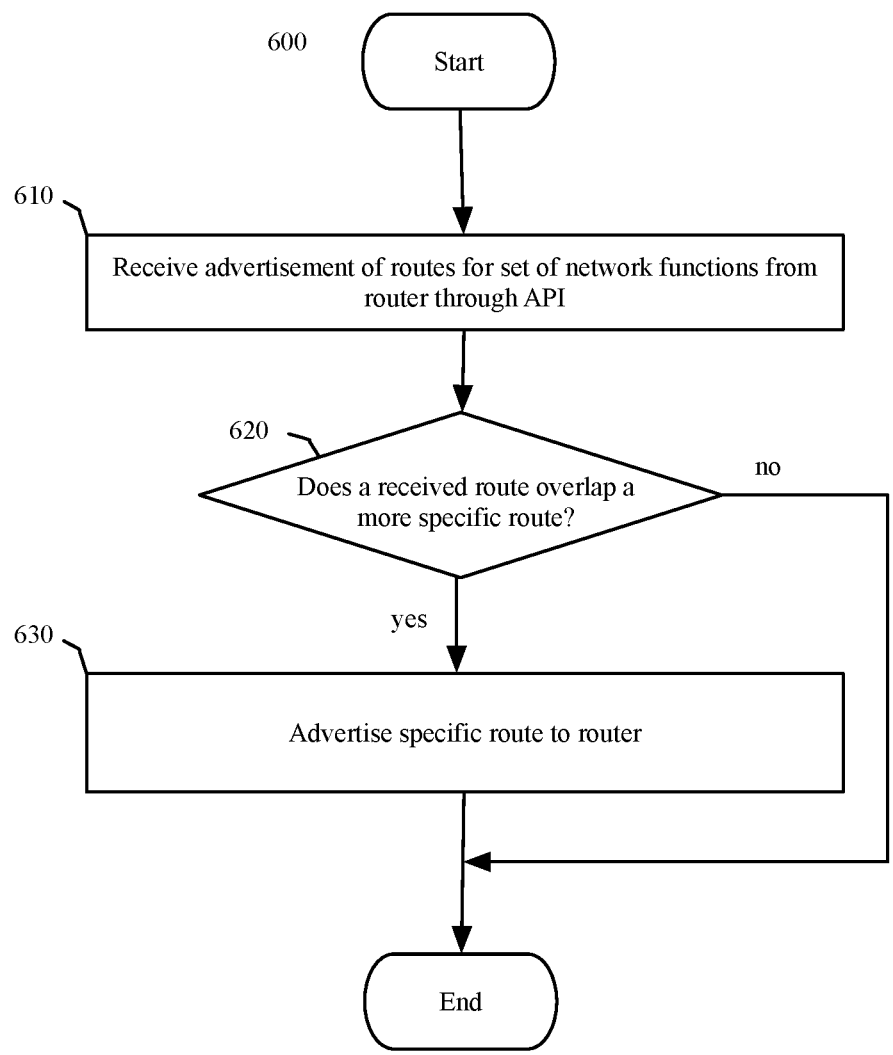
FIG. 6 conceptually illustrates a process for receiving an advertisement for a set of routes and advertising a specific route in return.

FIG. 6 conceptually illustrates a process 600 for receiving an advertisement for a set of routes and advertising a specific route in return. In some embodiments, process 600 is implemented by a routing network function of a provider logical router that provides access to tenant logical networks to an external network as described in relation to FIGS. 1-3. In some embodiments, process 600 is performed by an external routing element that also makes use of a set of APIs common to both the external and local routing elements. The process begins by receiving (at 610) a set of routes advertised by another routing network function through an API. In some embodiments, APIs are used to advertise availability and routes between network functions executing on a same host machine. APIs are also used to communicate between network functions executing on different host machines in some embodiments.

The process continues by determining (at 620) whether a received route overlaps a more-specific route. In some embodiments, this determination is done upon receiving the advertisement from the routing network function. This determination is also made upon receiving advertisements from other routers or routing network functions, to see if the newly received routes match the received route. For example, if the original advertisement includes the route 10.1.0.0/16, the process 600 determines if any more-specific routes matching that prefix (e.g., 10.1.5.0/24 or 10.1.135.0/24), are contained in a routing table. Additionally, upon receiving a route advertisement from another routing element (e.g., 10.3.4.0/24 or 10.1.23.0/24), the process 600 determines whether the newly received route overlaps with the route advertised by the routing network function (e.g., 10.3.4.0/24 does not overlap with 10.1.0.0/16, but 10.1.23.0/24 does overlap with 10.1.0.0/16).

If the received route overlaps with a more-specific route as described above, the process advertises (at 630) the more-specific route to the routing network function from which the overlapping less-specific route was received (e.g., advertising the more-specific route to the port/router identified in the less-specific route). This allows the routing network function that advertised the more-specific route to learn the correct routing information for the more-specific route. In some embodiments, the advertisement of the more-specific route is accomplished through API calls, while in other embodiments standard routing protocols are used because the router will be running a protocol stack and does not require additional elements to make use of the standard routing protocols. If the received route does not overlap or the more-specific route has been advertised, the process ends. It is to be understood that portions of the process may be performed each time a route is received from either a routing network function executing on the same host machine as the routing element performing the process or from an external routing element.

Figure 7:
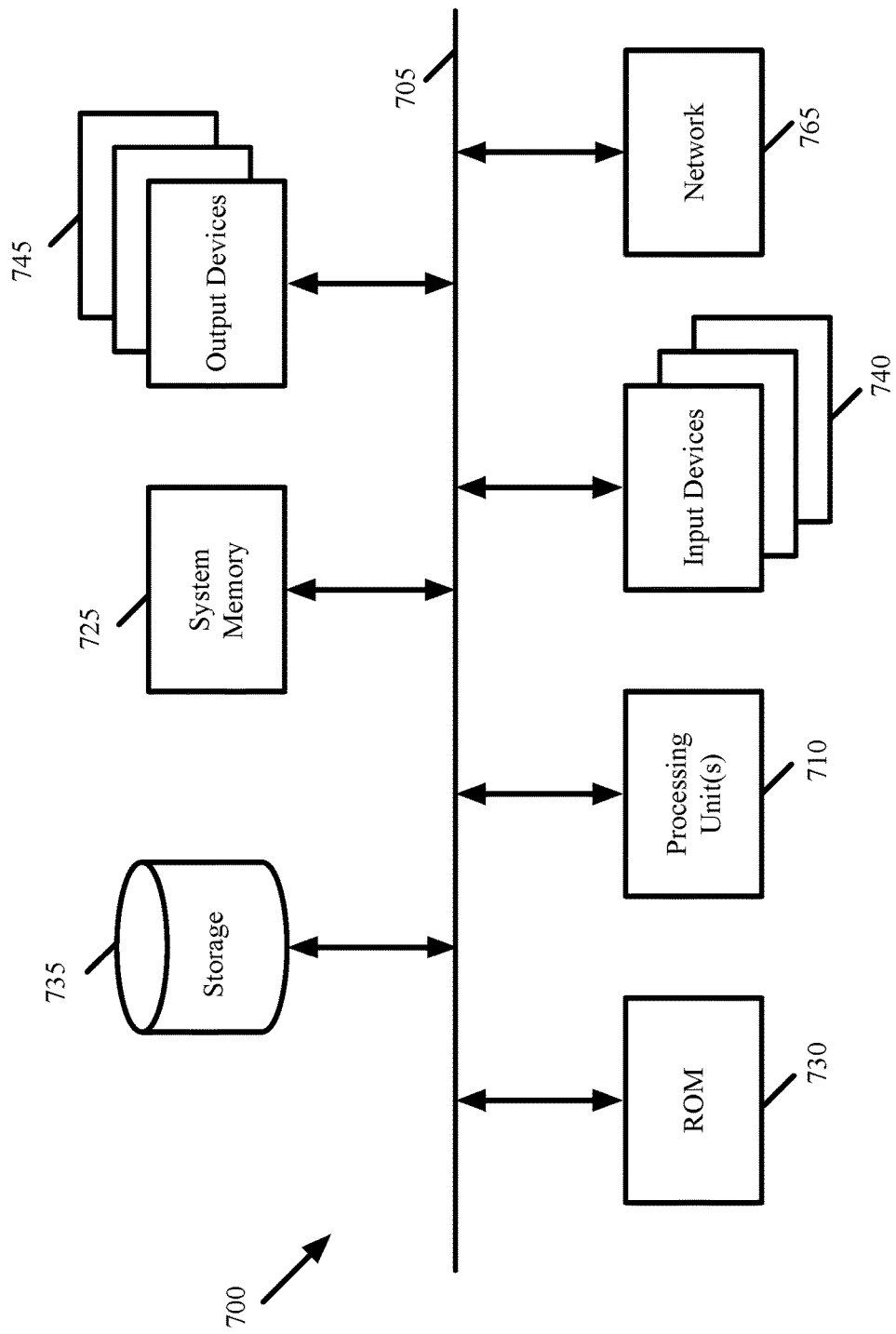
FIG. 7 conceptually illustrates an electronic system with which some embodiments of the invention are implemented.

FIG. 7 conceptually illustrates an electronic system 700 with which some embodiments of the invention are implemented. The electronic system 700 can be used to execute any of the control, virtualization, or operating system applications described above. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such as random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs), or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host machine using resources of the host machine virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 5 and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for communicating between a plurality of network functions executing on a host computer, the method comprising:

at a routing first network function, receiving a data message advertising the availability of a second network function through a first application programming interface (API) provided by the first network function instead of using a routing protocol to advertise the availability of the second network function; and from the routing first network function, advertising the availability of the second network function to a third network function in the plurality of network functions using a second API of the third network function instead of using a routing protocol to advertise the availability of the second network function.

2. The method of claim 1, wherein the second network function provides at least one of a load balancing service, a network address translation (NAT) service, a routing service, a firewall service, and a virtual private network service.

3. The method of claim 1, wherein the received data message indicates a set of internet protocol (IP) addresses available at the second network function.

4. The method of claim 1, wherein the received data message includes information indicating that the second network function is acting as a standby network function.

5. The method of claim 1 wherein the third network function comprises a routing network function that advertises the availability of the second network function to routers outside of the host computer using a routing protocol.

6. The method of claim 5, wherein advertising the availability of the second network function to the routing third network function comprises advertising a set of routes including an internet protocol (IP) address associated with the second network function.

7. The method of claim 1, wherein the second network function monitors the health of backend servers associated with the service of the second network function.

8. The method of claim 7, wherein, when the backend servers are unavailable, the second network function uses a third API to withdraw the availability of the network function from the first routing network function.

9. The method of claim 8, wherein the second network function uses a fourth API to withdraw the availability of the network function from additional network functions in the plurality of network functions.

10. The method of claim 8, wherein the routing first network function withdraws the availability of the second network function from the set of other network functions in the plurality of network functions.

11. The method of claim 1 further comprising from the routing first network function, advertising the availability of the second network function to an additional set of network functions in the plurality of network functions using a third API provided by each network function in the set of network functions.

12. The method of claim 1, wherein the routing first network function advertises the availability of the second network function to network elements outside of the host computer using a routing protocol and a data message passing through a network protocol stack.

13. A method for communicating between a plurality of network functions executing on a host computer, the method comprising:
  at a routing first network function, receiving a data message advertising the availability of a second network function through a first application programming interface (API) provided by the first network function instead of using a routing protocol to advertise the availability of the second network function;
  from the routing first network function, advertising the availability of the second network function to a routing third network function in the plurality of network functions using a second API of the routing third network function instead of using a routing protocol to advertise the availability of the second network function;
  from the routing first network function, advertising a set of summarized routes comprising an internet protocol (IP) prefix that applies to multiple IP addresses advertised by network functions in the plurality of network functions; and
  receiving from the routing third network function a route for an IP address to which the IP prefix applies, the route initially received at the routing third network function from a source external to the host computer.

14. A non-transitory machine readable medium storing a program for execution by a set of processing units, the program for communicating between a plurality of network functions executing on a host computer, the program comprising sets of instructions for:
  at a routing first network function, receiving a data message advertising the availability of a second network function through a first application programming interface (API) provided by the routing first network function; and
  from the routing first network function, advertising the availability of the second network function to a third network function in the plurality of network functions using a second API of the third network function.

15. The non-transitory machine readable medium of claim 14, wherein the second network function provides at least one of a load balancing service, a network address translation (NAT) service, a routing service, a firewall service, and a virtual private network service.

16. The non-transitory machine readable medium of claim 14, wherein the received data message indicates a set of internet protocol (IP) addresses available at the second network function.

17. The non-transitory machine readable medium of claim 14, wherein the received data message includes information indicating that the second network function is acting as a standby network function.

18. The non-transitory machine readable medium of claim 14, wherein the program further comprises sets of instructions for:
  from the routing first network function, advertising a set of summarized routes comprising an internet protocol (IP) prefix that applies to multiple IP addresses advertised by network functions in the plurality of network functions; and
  receiving from a routing third network function a route for an IP address to which the IP prefix applies, the route initially received at the routing third network function from a source external to the host computer.

19. The non-transitory machine readable medium of claim 14, wherein the second network function monitors the health of backend servers associated with the service of the second network function.

20. The non-transitory machine readable medium of claim 19, wherein, when the backend servers are unavailable, the second network function uses a third API to withdraw the availability of the network function from the first routing network function.

21. The non-transitory machine readable medium of claim 14, wherein the program further comprises a set of instructions for, from the routing first network function, advertising the availability of the second network function to an additional set of network functions in the plurality of network functions using a third API provided by each network function in the set of network functions.

* * * * *